Jan. 9, 1934.    R. J. BRITTAIN, JR    1,943,054
JOURNAL BOX
Filed Oct. 12, 1929    2 Sheets-Sheet 1

INVENTOR:
RICHARD J. BRITTAIN, JR.
BY
HIS ATTORNEY.

Jan. 9, 1934.    R. J. BRITTAIN, JR    1,943,054
JOURNAL BOX
Filed Oct. 12, 1929    2 Sheets-Sheet 2

INVENTOR:
RICHARD J. BRITTAIN, JR.
BY
HIS ATTORNEY.

Patented Jan. 9, 1934

1,943,054

UNITED STATES PATENT OFFICE 1,943,054

JOURNAL BOX

Richard J. Brittain, Jr., Bloomfield, N. J., assignor to General Motors Corporation, Detroit, Mich., a corporation of Delaware Application October 12, 1929. Serial No. 399,351

8 Claims. (Cl. 308—180)

This invention relates to journal boxes and comprises all the features of novelty herein disclosed. An object of the invention is to provide an improved thrust construction for transmitting thrust forces in two directions between a shaft and a journal box. Another object is to provide an improved thrust block. Another object is to provide improved lubricating devices for journal and thrust bearings of an axle box. Still another object is to provide a journal box with improved means for supporting a load thereon. To these ends and to improve generally and in detail upon devices of this character, the invention further consists in the various matters hereinafter described and claimed.

In its broader aspects the invention is not necessarily limited to the specific construction selected for illustrative purposes in the accompanying drawings in which Fig. 1 is a vertical, longitudinal section of an axle box.

Figure 1:
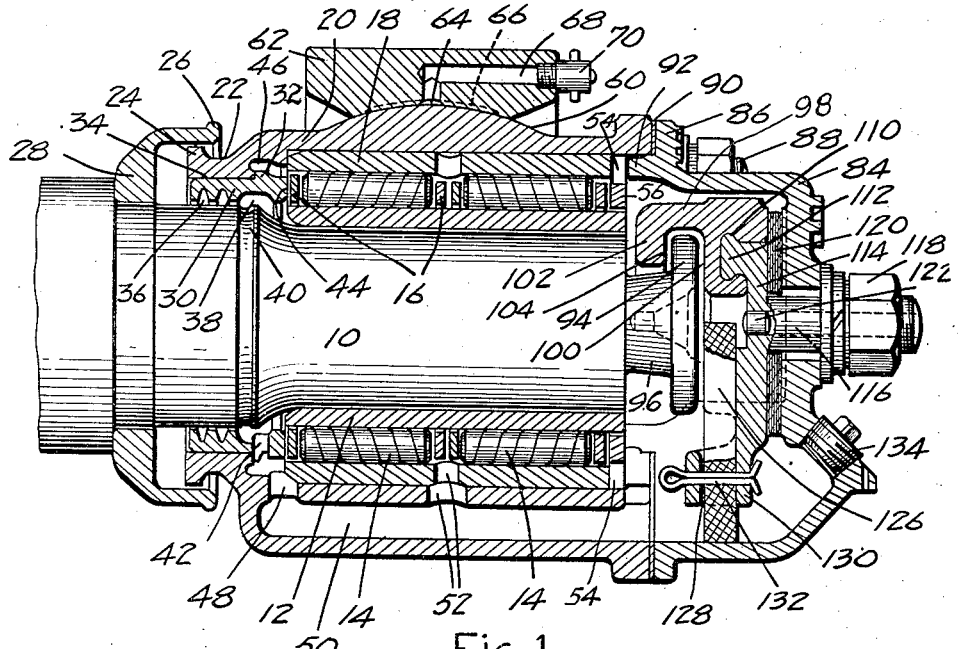
Figure 2:
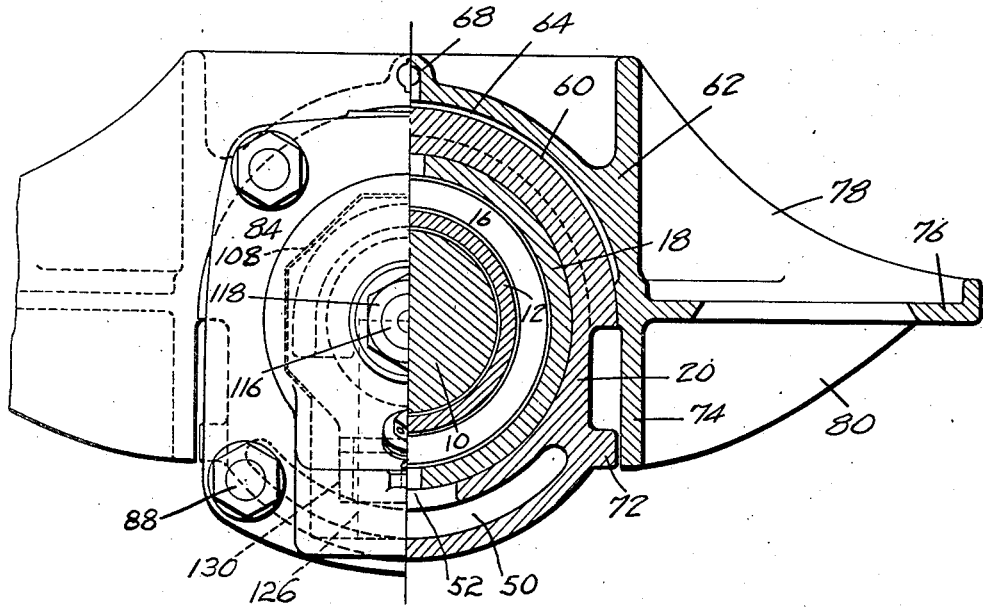
Fig. 2 is an end view with one half in cross section.
Figure 3:
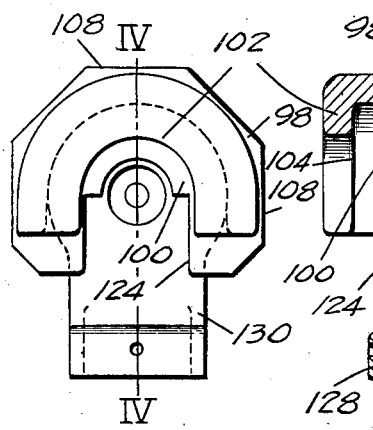
Fig. 3 is an inner end view of a thrust block.
Figure 4:
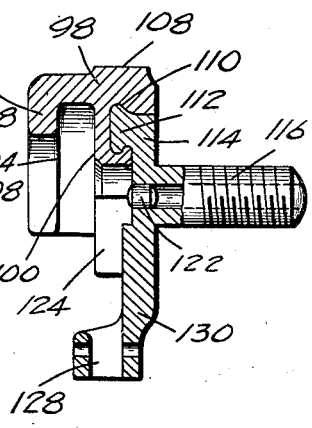
Fig. 4 is a section on line IV—IV of Fig. 3.

In Figs. 1 and 2, the numeral 10 indicates a shaft or axle carrying a raceway sleeve 12 receiving roller bearings 14 having end rings 16. The rollers run in an outer sleeve 18 contained in the bore of a housing herein shown as an axle box 20. At one end, the box has a peripheral drain groove 22 and an out-turned end flange 24 enclosed by the flanged end 26 of a water guard whose hub 28 is pressed on the shaft against a shoulder. A bushing 30 having a locating flange 32 is pressed into a bore 34 at the end of the box, the bushing having grease grooves 36 to seal its joint with the axle and a wide oil collecting groove 38 which receives oil thrown off from a rib 40 on the axle and directs it to a notch 42 at the bottom. The bushing has a guiding or wear face 44 for the adjacent bearing end ring and the box has a relief groove 46 outside the bushing and of greater diameter than the bearing. This construction allows the oil propelled by the rollers to run into the relief groove 46 and down through a notch 48 to the cored out receptacle 50 at the bottom of the box without building up a pressure tending to force the oil along the axle and out of the box. Holes 52 connect the receptacle 50 with the adjacent ends of the two roller bearings 14 and ti ere are notches 54 in a wear plate or bearing thrust ring 56 near the outer end of the axle so that oil, kept at the level of the lowermost rollers, has free access to the bearings at three locations.

The upper portion of the box is provided with a spherical segment or surface 60 engaging a similar surface on a saddle 62 which embraces the box. The saddle has an arcuate lubricant groove 64 connecting branch grooves 66 with a duct 68 to which lubricant is supplied through a suitable fitting 70. The saddle and box thus have provision for relative movement in any direction, tilting of the box being limited by lugs 72 spaced from straight extensions 74 on the saddle. The saddle has horizontal extensions with spring seats 76 braced by side flanges or webs 78 and 80, the spring seats being at axle level to avoid a tendency to tilt the box and overload the ends of the bearings.

The outer end of the box is closed by an end cap 84 having a flange 86 secured by bolts 88 against a gasket 90, an arcuate projection 92 on the cap entering the box at the top and sides just outside of the wear plate 56. The axle has an end enlargement or collar 94 and a necked-down portion forming a groove 96 the bottom surface of which is preferably slightly tapering to direct oil to a thrust surface on the inside of the collar. Such oil may come from the roller bearings through the uppermost notch 54 in the ring 56. A thrust block 98, preferably of bronze cast on harder material, is carried by the end cap and comprises a thrust surface 100 for the end of the axle and an overhanging arcuate portion 102 provided with a thrust surface 104 for the inner side of the axle collar. Externally, the block is provided with flat sides 108 confined by similar flat surfaces of the end cap to prevent rotation.

Figure 5:
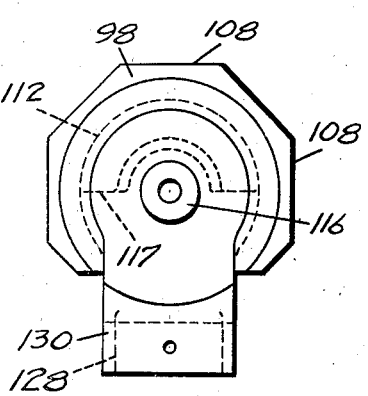
Fig. 5 is an outer end view.
Figure 6:
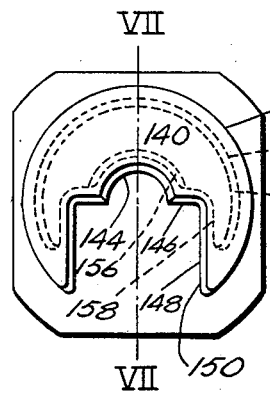
Fig. 6 is an end view of a modified form of thrust block.
Figure 7:
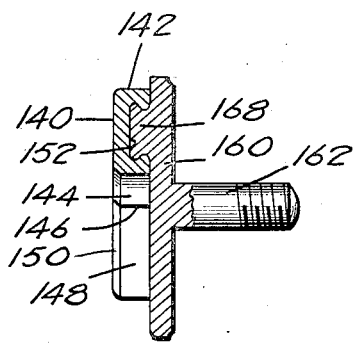
Fig. 7 is a section on line VII—VII of Fig. 6.
Figure 8:
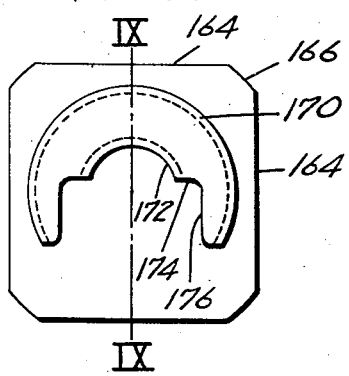
Fig. 8 is an end view of an anchor plate.
Figure 9:
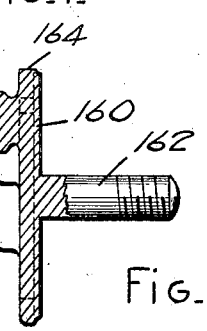
Fig. 9 is a section on line IX—IX of Fig. 8.

The bronze block has an undercut arcuate slot 110 obtained by casting it upon an arcuate tongue 112 on an anchor plate 114 having an integral threaded stud 116. The tongue terminates in straight or non-arcuate surfaces 117 (Fig. 5) around which the block is cast thereby preventing rotation of the block by the axle. The anchor plate is preferably made of cast or forged steel and its tongue is tinned to receive the bronze. A nut 118 threaded on the stud 116 clamps the thrust block and its anchor plate against a series of washers or spacing plates 120 in the end cap. The aggregate thickness of the spacing plates is so selected as to give the desired lateral clearance between the axle collar and the opposing thrust surfaces on the thrust block. This affords a means to adjust these clearances to suit variations in overall length of axles or in width between truck frame centers. To secure a sound casting, the stud is preferably cast hollow and the opening subsequently closed by a suitable plug 122. The bronze block has suitable clearance with the thrust surfaces of the axle to allow the usual play while taking thrust in either direction. It has a notch 124 to receive the upper end of a lubricating wick 126 which extends down through a hole 128 at the lower end of an extension 130 of the anchor plate where it is secured by a cotter pin 132. The wick conveys oil from the reservoir to the thrust surfaces at the outer side of the axle collar. A removable plug 134 provides for introducing oil to the end cap and to the box of which it forms a part.

When axle thrust is to be resisted only in an outward direction, the thrust block and anchor plate may be constructed as indicated in Figs. 6, 7, 8 and 9. The thrust block 140 has an arcuate outer wall 142 and an inner wall composed of a semicircular surface 144 and straight surfaces 146 and 148 which form a slot for the wick, the edges 150 being chamfered. On the rear, the block has an undercut arcuate slot 152 with rounded outer edges 154, rounded inner edges 156 and a cut-out portion 158. The anchor plate 160 has an integral threaded stud 162 and outer flat faces 164 connected by arcs 166, the flat faces to fit similar faces in the end cap. The anchor plate has a projecting arcuate tongue 168 with rounded edges 170 and 172 to which the edges 154 and 156 of the block conform in casting. Straight or non-arcuate surfaces 174 and 176 on the plate, to which the thrust block conforms, prevent rotation of the thrust block on the tongue.

I claim:

1. In a device of the character described, a housing, an axle journalled in the housing and having a collar, a thrust block carried by the housing and opposing the outer side of the collar to take thrust of the axle in one direction, the thrust block having a portion overhanging the collar to take thrust of the axle in the other direction, a wick for conveying lubricant to the thrust surfaces on the outerside of the collar, and a tapered axle surface inside the collar for conveying lubricant to the thrust surfaces on the inner side of the collar; substantially as described.

2. In a device of the character described, a housing, an axle journalled in the housing and having a collar, a thrust block carried by the housing and opposing the outer side of the collar to take thrust of the axle in one direction, the thrust block having a portion overhanging the collar to take thrust of the axle in the other direction, a wick for conveying lubricant to the thrust surfaces on the outer side of the collar, and means for conveying lubricant to the thrust surfaces on the inner side of the collar; substantially as described.

3. In a device of the character described, a housing, an axle journalled in the housing and having a collar, a thrust block carried by the housing and opposing the outer side of the collar to take thrust of the axle in one direction, the thrust block having a portion overhanging the collar to take thrust of the axle in the other direction, means for conveying lubricant from the housing to the thrust surfaces on the outer side of the collar, and a tapered axle surface for conveying lubricant to the thrust surfaces on the inner side of the collar; substantially as described.

4. In a device of the character described, a housing, an axle journalled in bearings in the housing and having a collar and a groove at the inner side of the collar, thrust means carried by the housing and entering the groove for engagement with the inner side of the axle collar, the shaft having a tapering surface at the bottom of the groove for delivering lubricant to the inner side of the collar, and the groove being in communication with the bearings to receive lubricant therefrom; substantially as described.

5. In a device of the character described, a housing, an axle extending into the housing, antifriction bearings between the axle and the housing, an end cap closing the outer end of the housing, end thrust devices between the axle and the end cap, the housing having a longitudinally extending lubricant reservoir below the bearings, a thrust ring held between the outer end of the bearings and the end cap for guiding the bearings, the ring having an upper notch for the passage of lubricant from the bearings to the end thrust devices, and the ring having a lower notch for the passage of lubricant from the reservoir directly to the outer end of the bearings; substantially as described.

6. In a device of the character described, a housing, a shaft extending into the housing, bearings between the shaft and the housing, an end wall closing the outer end of the housing, a thrust block opposing the end of the axle, means for lubricating the engaging faces of the thrust block and the axle, the housing having a lubricant reservoir extending lengthwise under the bearings, the inner ends of the bearings being in free communication with the inner end of the reservoir, the axle extending beyond the bearings and having its thrust face above and open to the outer end of the reservoir, a ring between the bearings and the end wall of the housing and having a guide face for the bearings, and the ring also having a bottom opening providing free communication between the outer ends of the bearings and the reservoir; substantially as described.

7. In a device of the character described, a housing, a shaft journalled for rotation in the housing and having a collar, a thrust block carried by the housing for engaging the shaft and comprising an anchor plate and a two-way thrust portion of softer material, the anchor plate having an extension projecting towards the bottom of the housing and provided with means to hold a wick, a securing stud projecting from the anchor plate through the housing, the upper portion of the anchor plate and the thrust portion being united by a tongue and groove, the two-way thrust portion of softer material having a slot providing for engagement of the wick with the anchor plate, and said thrust portion having a thrust surface opposed to the shaft and an arcuate overhang with an interior thrust surface; substantially as described.

8. In a device of the character described, a thrust block comprising an anchor plate and a thrust portion of softer material, the anchor plate having a securing stud projecting therefrom and a flat face to engage a wick, the thrust portion of softer material being slotted to embrace the wick and to admit the wick into engagement with said flat face on the anchor plate, and the thrust portion being united to the anchor plate by a tongue and groove; substantially as described.

RICHARD J. BRITTAIN, Jr.